June 17, 1952     C. J. JOHNSON     2,600,540
POWER-OPERATED DISINFECTING PRUNING SHEARS
Filed Sept. 3, 1946
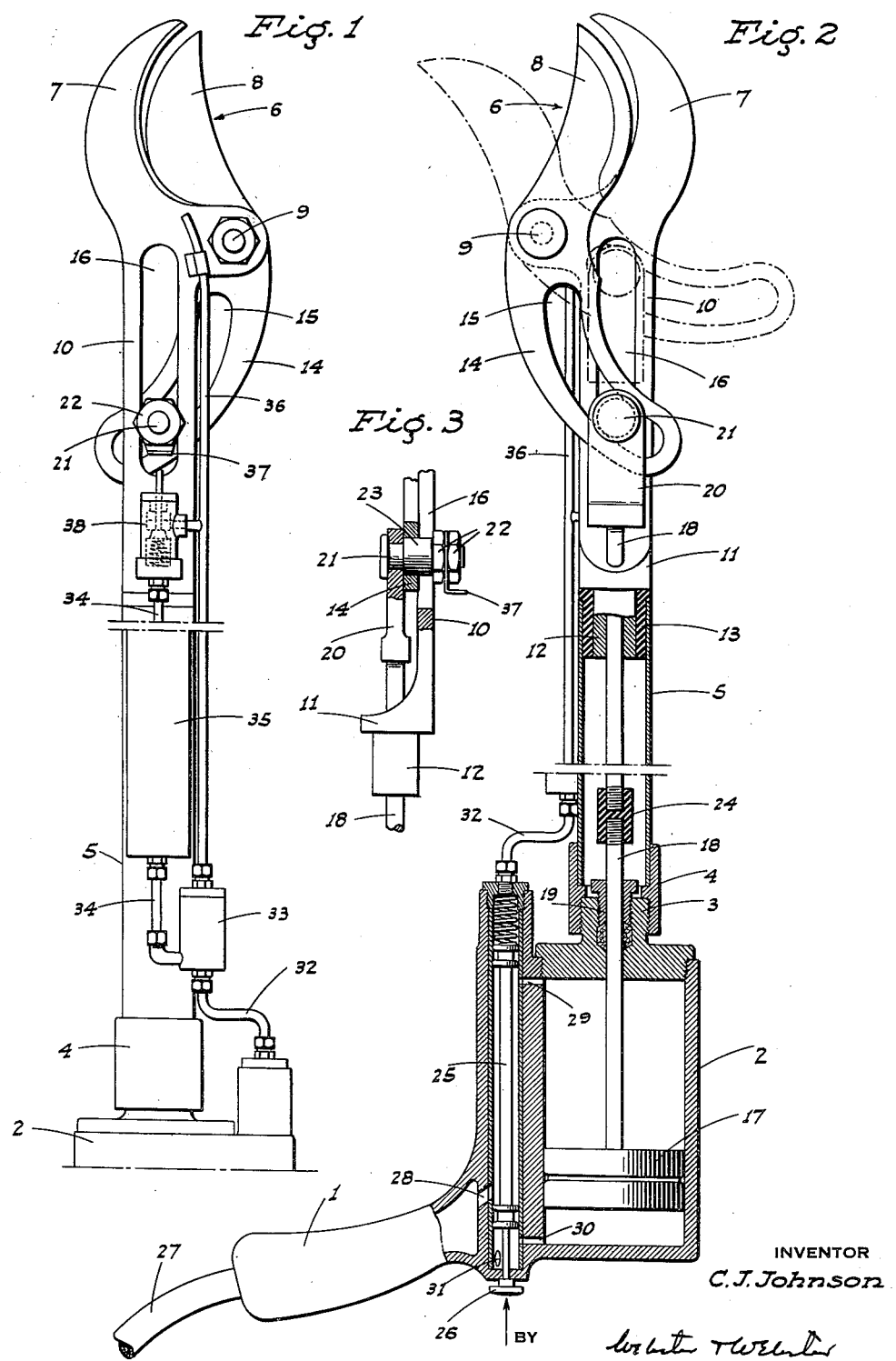
INVENTOR
C. J. Johnson
ATTORNEYS Patented June 17, 1952

2,600,540

UNITED STATES PATENT OFFICE 2,600,540

POWER-OPERATED DISINFECTING PRUNING SHEARS

Charles J. Johnson, Sacramento, Calif., assignor of one-half to Frank E. King, Sacramento, Calif.

Application September 3, 1946, Serial No. 694,584

1 Claim. (Cl. 47—1)

This invention relates to, and it is an object to provide, improved pruning shears which are power actuated; the invention here being shown as embodied in long reach or pole type pruning shears.

A further characteristic of the present invention is the novel shear blade assembly and means for power actuating the same; said means including a valve controlled, fluid pressure actuated power cylinder.

An additional characteristic of this invention is the provision of an automatic device on the implement operative to discharge a quantity of liquid disinfectant on each cut as made by the shear blade assembly on a limb.

Another characteristic of the invention resides in the provision of an insulating medium between the shear blade assembly and the remainder of the implement so that if a live wire is accidentally engaged by said assembly, shock cannot be transmitted to the operator.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings:

Fig. 1 is an elevation, foreshortened, of the improved pruning shears showing the shear blade assembly in closed position.

Fig. 2 is an elevation, foreshortened, of the pruning shears taken from the opposite side; the actuating mechanism being mainly in section.

Fig. 3 is a fragmentary view, partly broken away, showing the pivotal connection between the actuating rod and the shanks of the shear blade assembly.

Referring now more particularly to the characters of reference on the drawings, the implement comprises a hand grip 1 fixed in connection with, and projecting laterally from, one end of a cylinder 2; such cylinder having an externally threaded, axially projecting boss 3 on its opposite end. A collar 4 connects the boss 3 in axial alinement with an elongated tubular pole 5 which is fitted, at its outer end, with a shear blade assembly, indicated generally at 6.

The shear blade assembly includes a fixed blade 7 and a cooperating movable blade 8; the latter being pivotally connected by a cross bolt 9 with said fixed blade 7.

The fixed blade 7 includes a substantially straight rigid shank 10 formed with a foot 11 having a downwardly extending boss 12 centrally thereon. The boss 12 is fitted in the upper end of the pole 5, and the foot 11 and boss 12 are insulated away from said pole by means including a dielectric sleeve 13 interposed between the boss 12 and said pole 5.

The movable blade 8 includes a depending curved rigid shank 14 which intersects the straight shank 10 of the fixed blade 7; said shanks including therein a curved slot 15 and a straight slot 16, respectively.

A double-acting piston 17 is operatively disposed in the cylinder 2 and is fixed in connection with an actuating rod 18 which extends out of the cylinder 2 through a packing gland 19 into the tubular pole 5; said rod extending to a point adjacent the shear blade assembly 6. At its upper end the actuating rod 18 is fitted with a head 20 which carries a fixed, laterally projecting bolt 21 which extends through the slots 15 and 16. On the side of the blade assembly opposite the head 20 the bolt 21 carries lock nuts 22, and a roller 23 on said bolt 21 rides in the slots 15 and 16.

A dielectric connector 24 is interposed in the actuating rod 18. By reason of the insulation of the shear blade assembly 6 from the pole 5 by means including the dielectric sleeve 13, and the interposition of the dielectric connector 24 in the actuating rod 18, it is impossible for any electric shock to be transmitted to the operator should said shear blade assembly 6 be engaged accidentally with a live wire.

It will be seen that upon reciprocation of the piston 17 in the cylinder 2, the blades 7 and 8 will relatively move between a normally open position to a closed position and return, whereby to effect a cutting action. This is accomplished by reason of the fact that when the piston 17 reciprocates, the head 20 advances and then retracts, causing corresponding shifting movement of the bolt 21 and roller 23. When the roller is so moved in the slots 15 and 16, the shank 14, on account of the curvature of its slot, is swung in a direction to cause closing and opening movement of the blade 8 relative to the blade 7.

Reciprocation of the piston 17 in the cylinder 2 is controlled through the medium of a double-acting plunger or piston valve unit 25 incorporated in the cylinder 2 along the side thereof adjacent the hand grip 1; said valve unit 25 including an exteriorly accessible push button 26. Fluid under pressure is supplied to the valve unit 25 by a flexible conduit 27 which leads into the hand grip 1, and such pressure is delivered from within said hand grip into the valve unit 25 through a port 28.

In one position of the valve unit 25 fluid pressure delivers into the cylinder 2 through a duct 29, pressure from the opposite side of the piston then bleeding through a duct 30 out of the cylinder to escape through a port 31. In the opposite position of the valve unit 25, fluid pressure delivers through the duct 30 and escapes through the duct 29 into the forward end of the valve unit 25, whence said escaping pressure feeds into a conduit 32. This occurs when the piston 17 is moving in a direction to open the shear blade assembly.

The conduit 32 leads to a pressure regulating or reducing valve 33 on one side of the pole 5, from which an outlet conduit 34 leads to a reservoir 35 on the pole, which reservoir is adapted to contain a quantity of liquid disinfectant. The pressure regulating valve 33 may be of any conventional type useful for the purpose as for instance that shown in the 1946 catalogue of the Imperial Co. of 1200 West Harrison Street, Chicago, Illinois, page 33, cut 80-74C regulator. Another outlet conduit 36 leads from the pressure regulating valve 33 to a point on the fixed blade 7 adjacent, and for discharge toward, the cutting edge of said blade: all pressure not passed through the outlet conduit 34 flowing through the outlet conduit 36. A trigger element 37 clamped between the nuts 22 engages and opens a valve 38, arranged to establish communication between the outlet conduit 34a of reservoir 35 and conduit 36 intermediate the ends of the latter, when the shear blade assembly 6 reaches a substantially closed position. Thus, as each element is cut by the blade assembly 6, and at the moment the latter closes, a quantity of disinfectant is discharged from the reservoir 35 through the valve 38 into the conduit 36 and thence onto the cut; the fluid pressure for accomplishing this action being derived, as previously indicated, from the exhaust of piston 17 as it advances from the position shown in Fig. 2.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In pruning shears having a shear blade unit including a movable blade and means to move said blade between open and closed positions, a pole depending from the blade unit, a fluid reservoir secured on the pole intermediate its ends and adapted to be maintained under pressure, a conduit leading from the reservoir to a point adjacent the blade unit for discharge into a cut made thereby, a normally closed control valve in the conduit having an exposed operating element, and a finger mounted for movement with the movable blade arranged to engage the operating element and open the valve when said blade moves to a closed position.

CHARLES J. JOHNSON.

REFERENCES CITED

The following references are of record in the file of this patent:

UNITED STATES PATENTS

| Number | Name | Date |
|---|---|---|
| 379,359 | Bosch | Mar. 13, 1888 |
| 773,743 | Von Hoffmann | Nov. 1, 1904 |
| 1,056,046 | Myers | Mar. 18, 1913 |
| 1,476,049 | Bush | Dec. 4, 1923 |
| 1,741,172 | Huxman | Dec. 31, 1929 |
| 2,075,341 | Goodman | Mar. 30, 1937 |
| 2,277,442 | Kuhlman | Mar. 24, 1942 |
| 2,366,909 | Johnson | Jan. 9, 1945 |
| 2,446,011 | Johnson | July 27, 1948 |
| 2,462,701 | Wirth | Feb. 22, 1949 |

FOREIGN PATENTS

| Number | Country | Date |
|---|---|---|
| 3,970 | Great Britain | of 1886 |